United States Patent [19]
Takeuchi et al.

[11] Patent Number: 5,592,467
[45] Date of Patent: Jan. 7, 1997

[54] NETWORK NODE CROSS-CONNECTION DEVICE USING SELECTABLE MEMORIES FOR NEW CONNECTION IN THE EVENT OF FAILURE

[75] Inventors: Yayoi Takeuchi; Yuuki Yoshifuji, both of Tokyo, Japan

[73] Assignee: NEC Corporation, Japan

[21] Appl. No.: 350,725

[22] Filed: Dec. 7, 1994

Related U.S. Application Data

[63] Continuation of Ser. No. 876,358, Apr. 30, 1992, abandoned.

[30] Foreign Application Priority Data

Apr. 30, 1991 [JP] Japan .................................. 3-128758
Jun. 12, 1991 [JP] Japan .................................. 3-166244

[51] Int. Cl.⁶ ..................................................... H04J 1/16
[52] U.S. Cl. .................................. 370/225; 340/827
[58] Field of Search .................................. 370/16, 28, 54, 370/60, 85.13, 58.1, 66, 84, 110.1, 63; 379/325, 279; 340/825.03, 825.22, 825.79, 827

[56] References Cited

U.S. PATENT DOCUMENTS

| | | | |
|---|---|---|---|
| Re. 32,900 | 4/1989 | Orsic | 370/58.1 |
| 4,071,703 | 1/1978 | Schaffter | 370/63 |
| 4,385,206 | 5/1983 | Bradshaw et al. | 370/110.1 |
| 4,901,309 | 2/1990 | Turner | 370/60 |
| 4,905,226 | 2/1990 | Kobayashi | 370/66 |
| 5,033,045 | 7/1991 | Ramel et al. | 370/85.13 |
| 5,079,762 | 1/1992 | Tanabe | 370/60 |
| 5,119,366 | 6/1992 | Ardon et al. | 370/54 |
| 5,351,236 | 9/1994 | Pawelski | 370/84 |

*Primary Examiner*—Douglas W. Olms
*Assistant Examiner*—Shick Hom
*Attorney, Agent, or Firm*—Ostrolenk, Faber, Gerb & Soffen, LLP

[57] ABSTRACT

A cross-connection device installed in a node of a transmission network. Each of a plurality of memories stores particular connection information. To replace a transmission path, a selector selectively connects one of the memories to a group of switches. The device, therefore, replaces connection information to be used in a moment and adapts itself to changes in environment immediately.

5 Claims, 4 Drawing Sheets

14-1, 14-2: INPUT TERMINAL 15-1, 15-2: OUTPUT TERMINAL

16: CONTROL TERMINAL 17-1, 17-2: FLIP-FLOP 18-1, 18-2: FLIP-FLOP

NETWORK NODE CROSS-CONNECTION DEVICE USING SELECTABLE MEMORIES FOR NEW CONNECTION IN THE EVENT OF FAILURE

This is a continuation of application Ser. No. 0/876,358 filed on Apr. 30, 1992, now abandoned.

BACKGROUND OF THE INVENTION

1. Field of the Invention

The present invention relates to a cross-connection device installed in a node of a transmission network for switching transmission paths.

2. Description of the Background Art

With the advent of highly information-oriented society, the demand for communication is rapidly increasing and is, moreover, diversifying and advancing. A telephone set, for example, is almost one of necessaries of life today. Further, the transmission of text and graphic data by, for example, a facsimile machine and the transmission of information by, for example, a data terminal are added to the transmission of speech and that of data, respectively.

A transmission network is a communication system which transmits information or command data so as to meet the above-stated communication demands. A prerequisite with the transmission network is the capability of transmitting a greater amount of information more rapidly over a longer distance and processing information freely. However, what is required of the transmission network is, above all, to secure the transmission paths for implementing communication which is now an everyday occurrence. It is likely that a transmission path is interrupted by an error that occurs in a circuit due to a natural phenomenon or an accident, by concentrated call origination, by a hardware error of an exchange, by unexpected hardware bugs ascribable to unusual environments, etc.

Under the above condition, a cross-connection device replaces the faulty transmission path with a bypass transmission path. Also, the cross-connection device selectively sets up a high-grade and a low-grade transmission path for particular purposes of communication, i.e., switches a bypass transmission path assigned to computer data communication and a more short-circuited transmission path assigned to speech transmission.

Installed in a node of a transmission path, a conventional cross-connection device has a map that stores connection information indicating to which of many output transmission paths each input transmission path should be connected, a memory in which the connection information is written, and a group of switches for connecting each input transmission path to any of the output transmission paths. The control over such constituents is, in many cases, implemented by software. The problem with the conventional cross-connection device is that since it has only a single memory, it cannot change the connection information stored therein immediately. Specifically, a memory has the writing operation thereof controlled on the basis of addresses and data and, therefore, cannot rewrite a large amount of data in a moment. Moreover, it has been customary to assign the control over the cross-connection device to a single system. This is undesirable in that when a software error occurs, for example, in the single system, the paths of the switches and, therefore, the signal paths are disturbed which brings about communication errors.

BRIEF SUMMARY OF THE INVENTION

OBJECT OF THE INVENTION

It is therefore an object of the present invention to provide a cross-connection device capable of changing connection information immediately.

It is another object of the present invention to provide a cross-connection device capable of securing connection information for maintaining a minimum necessary number transmission paths even when a control system thereof fails.

SUMMARY OF THE INVENTION

A cross-connection device installed in a node of a transmission network of the present invention has a map storing beforehand at least two sets of connection information indicating to which of a plurality of output transmission paths a plurality of input transmission paths should each be connected, a first memory loaded with one of the two sets of connection information, a second memory loaded with the other set of connection information, a selector for selecting either the first or the second memory, and a group of switches for connecting each of the input transmission paths to any of the output transmission paths on the basis of the connection information of one of the first and second memories as selected by the selector.

On receiving a request for changing connection information, the selector selects the second memory in place of the first memory or the first memory in place of the second memory. To achieve the above objects of the invention, connection information meant for the non-selected memory should be written before that memory is selected.

Preferably, a cross-connection device installed in a node of a transmission network of the present invention has a first map storing beforehand at least one set of connection information indicating to which of a plurality of output transmission paths a plurality of input transmission paths should each be connected, a second map storing beforehand fixed connection information indicating the connection of particular ones of the input transmission paths to particular ones of the output transmission paths, at least one first memory loaded with the one set of connection information, a second memory loaded with the fixed connection information, a selector for selecting either of the first and second memories, a group of switches for connecting each of the input transmission paths to any of the output transmission paths on the basis of the connection information stored in the first memory or the second memory selected by the selector, a first control section for controlling at least the first map, and a second control section for controlling the second map and selector and implemented by hardware.

The selector usually selects the first memory. When an error occurs in the first control section, the selector selects the second memory with the result that the switches are operated on the basis of the fixed connection information. The fixed connection information relates to transmission paths to be secured when the first control section fails; the number of such information may be small. The second control section may involve manual operations.

BRIEF DESCRIPTION OF THE DRAWINGS

The above-mentioned and other objects, features and advantages of the invention will become more apparent by reference to the following detailed description of the invention taken in conjunction with the accompanying drawings, wherein.

DESCRIPTION OF THE PREFERRED EMBODIMENTS

Figure 1:
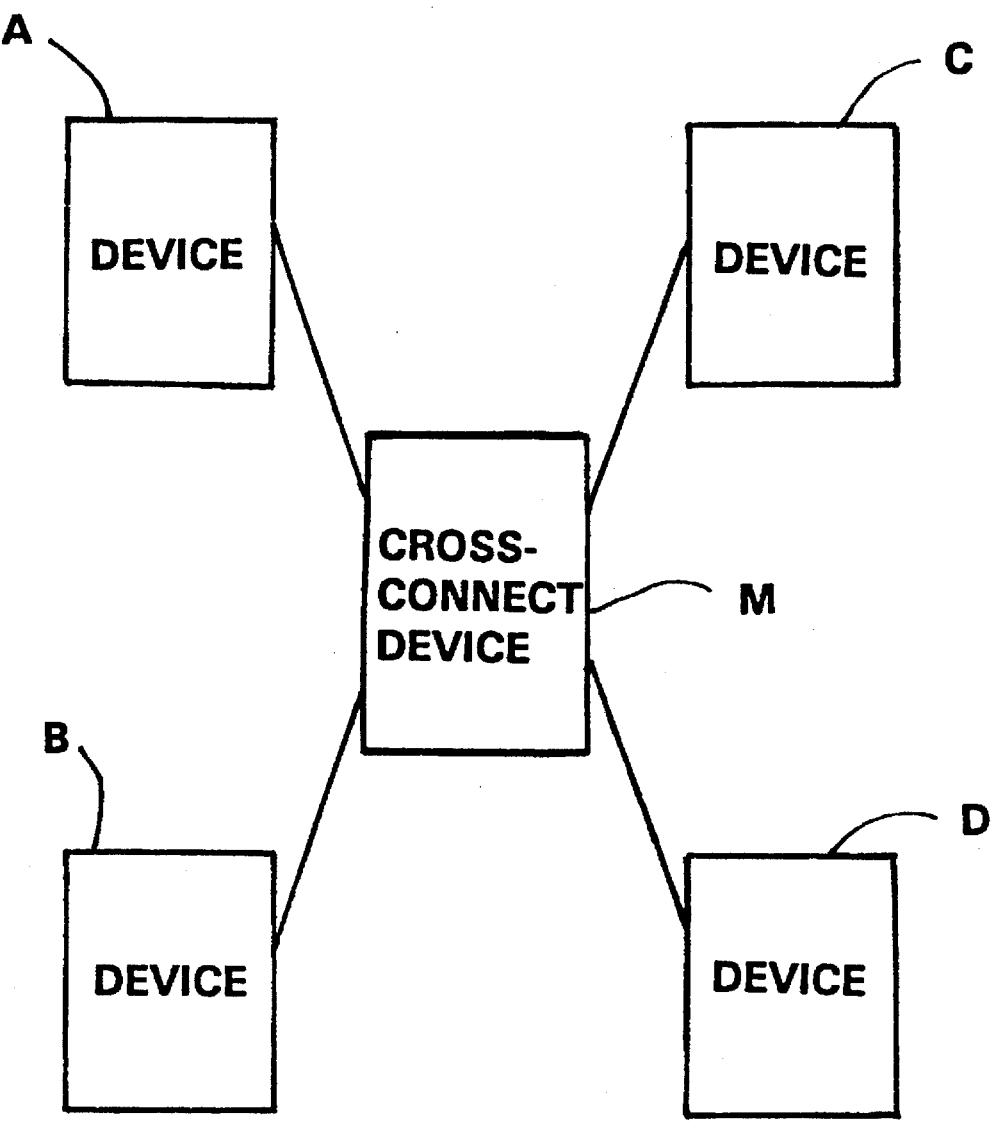
FIG. 1 is a block diagram schematically showing part of a transmission network to which the present invention is applicable.

Today, various areas in Japan are interconnected by a transmission network which allows communications be held between any town inside the country immediately. As FIG. 1 shows schematically, a cross-connection device M is located at a node included in the transmission network so as to transfer an input from a device A or B to a device C or D. Assuming that the node is situated in Tokyo, for example, the devices A and B may be a multiplexing device located in Tokyo and a transmission path from Sendai while the devices C and D may be carrier devices for transmission paths to Osaka and Nagano.

The cross-connection device M connects the device A to both of the devices C and D, to the device C or D, or to none of the devices C and D. This is also true with the device B. The cross-connection device M stores connection information for selecting any one of such connection conditions.

Figure 2:
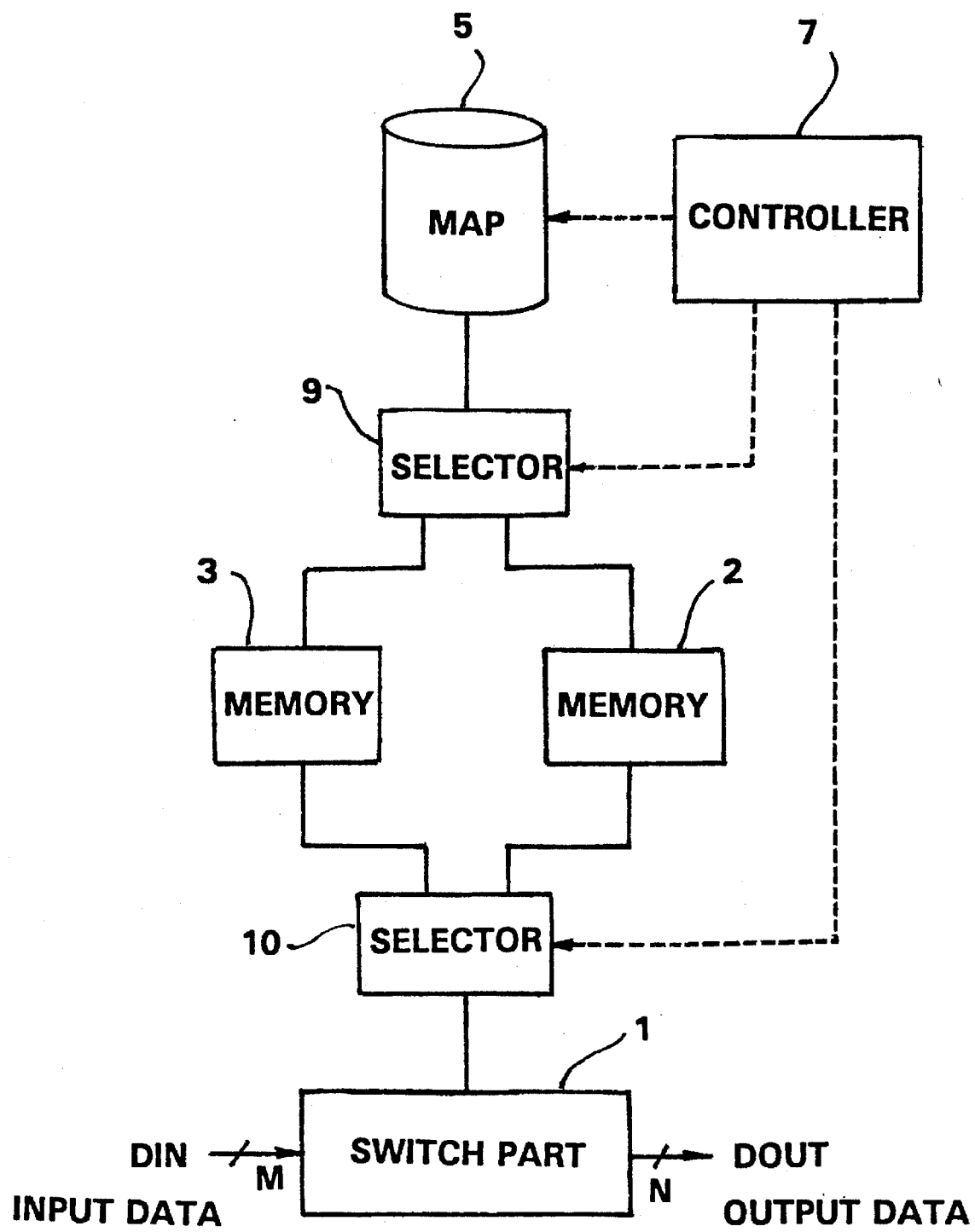
FIG. 2 is a block diagram schematically showing a cross-connection device embodying the present invention.

Referring to FIG. 2, a cross-connection device embodying the present invention is shown and made up of a switch section 1, two memories 2 and 3, a map 5, a control section 7, and two selectors 9 and 10. The map 5 is formed on, for example, a magnetic disk and stores a great number of sets of connection information for supervising the switch section 1 as to the connecting destinations. The selector 9 loads the memory 2 with one of the sets of connection information and loads the memory 3 with another set of connection information under the control of the control section 7. The memories 2 and 3 are implemented as random access memories having identical constructions, and each stores all the connection information necessary for connecting m input data and n output data. The selector 10 delivers either of the outputs of the memories 2 and 3 to the switch section 1 in response to an instruction from the control section 7. In response, the switch section 1 performs a switching operation according to the connection information fed from the memory 2 or 3. Implemented by software, the control section 7 writes connection information in the map 5, causes the selector 9 to write particular connection information to either of the memories 2 and 3, and causes the selector 10 to deliver particular connection information to the switch section 1.

Assume that the selector 10 has selected the memory 2, i.e., the switch section 1 has connected input data DIN and output data DOUT according to the connection information loaded in the memory 2. In this condition, when the through telephone line between Tokyo and Osaka, for example, is interrupted for some reason, communication between Tokyo and Osaka has to be set up by a bypass line routed through, for example, Nagano. Then, the connection information which the switch section 1 should follow has to be changed. Such a change also occurs when the call origination concentrates and in the event of replacement of transmission line between computer data and speech data which need data communication of higher quality.

The selector 10 executes the above-mentioned change of connection information in a moment in response to an instruction from the control section 7, i.e., it receives the output of the memory 3 in place of the output of the memory 2. Should the cross-connection device have only a single memory like a conventional cross-connection device, it could not be operated on the basis of alternative connection information unless the memory 2 was rewritten. It is, of course, necessary to load the memory 3 with connection information from the map 5 before the change of connection information. When connection information should be changed while the cross-connection device is operating with the information stored in the memory 3, it suffices to replace the memory 2 with the memory 3.

Figure 3:
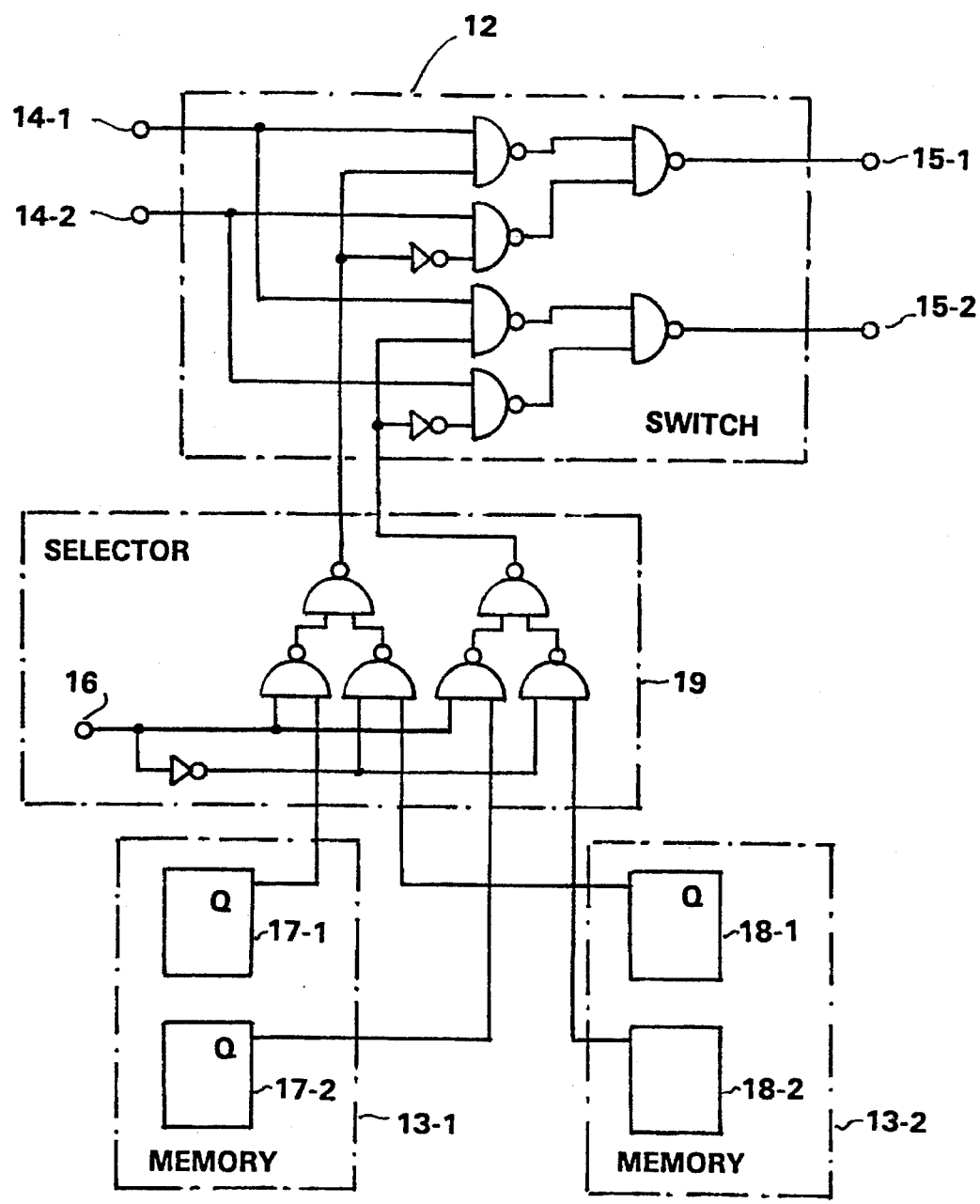
FIG. 3 is a logical circuit diagram showing a specific construction of a selector and switch included in the embodiment.

FIG. 3 shows a specific construction of part of the cross-connection device depicted in FIG. 2. In FIG. 3, there are shown a switch 12, a selector 19, a memory 13-1 and a memory 13-2 corresponding respectively to the switch section 1, selector 10, memory 2 and memory 3 shown in FIG. 2. The memories 13-1 and 13-2 are respectively made up of two flip-flops 17-1 and 17-2 and two flip-flops 18-1 and 18-2, so that each of them stores 2-bit connection information. The selector 19 has a control terminal 16 connected to the control section 7. The selector 19 selects the output of the memory 13-1 when a control signal fed from the control section 7 to the control terminal 16 is logical "1" or selects the output of the memory 13-2 when the control signal is logical "0". The resulting output of the selector 19 is applied to the switch 12.

The flip-flops 17-1 and 18-1 each transfers a signal on an input terminal 14-1 to an output terminal 15-1 when loaded with "1" or transfers a signal on an input terminal 14-2 to an output terminal 15-1 when loaded with "0". The flip-flops 17-2 and 18-2 each transfers a signal on the input terminal 14-1 to an output terminal 15-2 when loaded with "1" or transfers a signal on the input terminal 14-2 to the output terminal 15-2 when loaded with "0". Such results will be readily understood with reference to the connection of gates shown in FIG. 3 and by logical operations and are tubulated below.

|  | 17-1 | | | |
|---|---|---|---|---|
|  | "1" | ".1" | "0" | "0" |
| INPUT | | 17-2 | | |
| TERMINAL | "1" | "0" | "1" | "0" |
| 14-1 | 15-1 15-2 | 15-1 | 15-2 | |
| 14-2 | | 15-2 | 15-1 | 15-1 15-2 |

As the above table indicates, when both the flip-flop 17-1 (18-1) and the flip-flop 17-2 (18-2) are "1", the signal on the input terminal 14-1 is sent by broadcasting; when they are "0", the signal on the input terminal 14-2 is sent by broadcasting.

Figure 4:
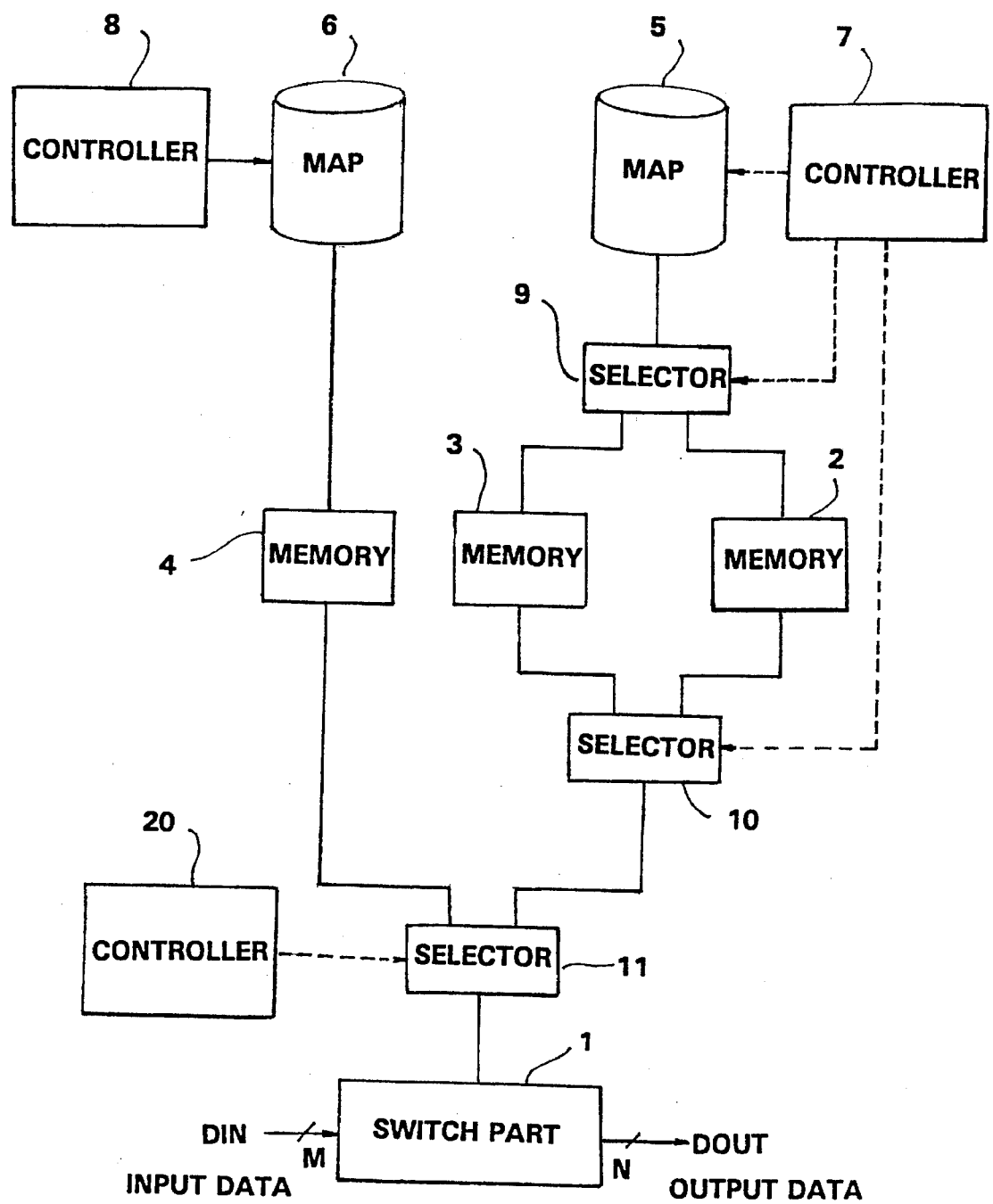
FIG. 4 is a block diagram showing an alternative embodiment of the present invention.

Referring to FIG. 4, an alternative embodiment of the present invention will be described. In FIG. 4, the same blocks as the blocks shown in FIG. 2 are designated by like reference numerals, and the description thereof is avoided for simplicity. As shown, the alternative embodiment has a memory 4, a map 6, two control sections and 20, and a selector 11 in addition to the various constituents of the previous embodiment. The selector 11 usually connects the output of the selector 10 to the switch section 1, so that the cross-connection device is operated in the same configuration as the device shown in FIG. 2.

The control section 8 writes, among connection information to be used under the above condition, information which is fixed and especially important in the map 6 beforehand. Such fixed information relates to a minimum number of transmission paths which have to be secured when some error occurs in the control section 7 to make it impossible to replace the transmission path on the basis of connection information stored in the memory 2 or 3. Also, the control section 8 writes the fixed connection information stored in the map 6 in the memory 4. When the control section 7 fails due to some error, the control section 20 causes the selector 11 to feed the output of the memory 4 to the switch section 1. As a result, the switch section 1 switches the transmission path by referencing the fixed connection information stored in the memory 4.

Both of the control sections 8 and 20 are implemented by hardware. The control sections 8 and 20 each deals with a small amount of fixed connection information and, therefore, can be provided with a simple configuration.

On the recovery of the control section 7, the control section 20 causes the selector 11 to deliver the output of the selector 10 to the switch section 1, thereby restoring the same operating condition as before the failure.

While the embodiment of FIG. 4 is shown as having two memories 2 and 3, it is practicable even with only one of the memories 2 and 3, in which case the selectors 9 and 10 are not necessary.

In summary, it will be seen that the present invention provides a cross-connection device capable of changing connection information in a moment and, therefore, adapting itself to changes in environment immediately. Further, even when an error occurs in a control section, a minimum necessary number of communication paths can be secured to eliminate the total interruption of communication.

Although the invention has been described with reference to specific embodiments, this description is not meant to be construed in a limiting sense. Various modifications of the disclosed embodiments, as well as other embodiments, will become apparent to persons skilled in the art upon reference to the description of the invention. It is therefore contemplated that the appended claims will cover any modifications or embodiments that fall within the true scope of the invention.

We claim:

1. A cross-connection device installed in a node of a transmission network, comprising:

map means for pre-storing a first set of connection information indicating to which of a plurality of output transmission paths, a plurality of input transmission paths should each be connected, and for pre-storing at least a second set of alternative connection information indicating alternatives for connecting the plurality of output transmission paths to the plurality of input transmission paths;

first memory means;

second memory means;

first selector means, arranged between said map means and said first and second memory means, for selecting either said first or second memory means for writing said first set of connection information stored in said map means into said first memory means and for writing said at least second set of alternative connection information into said second memory means;

switch means for connecting each of said input transmission paths to any of said output transmission paths on the basis of the connection information of either said first or second memory means; and second selector means, arranged between said switch means and said first and second memory means, for selecting either said first memory means or said second memory means and connecting the selected first or second memory means to said switch means.

2. A cross-connection device installed in a node of a transmission network, comprising:

first map means for pre-storing at least one set of connection information indicating to which of a plurality of output transmission paths, a plurality of input transmission paths should each be connected;

second map means for pre-storing fixed connection information indicating the connection of particular ones of said input transmission paths to particular ones of said output transmission paths;

first memory means;

second memory means;

switch means for connecting each of said input transmission paths to any of said output transmission paths on the basis of the connection information stored in one of said first and second memory means;

first control means for controlling at least said first map means;

first selector means arranged between said switch means and said first and second memory means, for selecting either said first memory means or said second memory means and connecting the selected first or second memory means to said switch means; and second control means for controlling said second map means and third control means for controlling said first selector means.

3. A cross-connection device including a cross-connect switch, comprising:

map means for storing two sets of alternative connection information of transmission paths for said cross-connect switch, said two sets of alternative connection information being stored in said map means;

switch means for producing a controlling signal;

first memory means loaded with one of said two sets of alternative connection information stored in said map means;

second memory means loaded with the other set of alternative connection information stored in said map means; and selector means responsive to said control signal for selecting either said first or said second memory means and sending said connection information of transmission paths to said cross-connect switch.

4. A cross connecting method for operating a cross connection device including map means for storing at least two sets of alternative connection information of a cross-connect switch, comprising the steps of:

reading one set of said alternative connection information from said map means to first memory means;

performing a connecting operation of said cross-connect switch in response to said one set of alternative connection information;

reading another set of said alternative connection information from said map means to second memory means through first selector means; and changing a connection of said cross-connect switch in response to said other set of alternative connection information, after said reading of said other set of alternative connection information is completed on the basis of second memory means.

5. A cross-connection device as in claim 2, wherein the first map means pre-stores at least a second set of connection information which is alternative to said at least one set of connection information, and wherein said first memory means comprises first and second memory units, said first memory unit being loaded with said at least one set of connection information and said second memory unit being loaded with said at least second set of connection information and further including second selector means for selecting either said first or said second memory unit for writing said at least first set of connection information stored in said first map means into said first memory unit and for writing said at least second set of alternative connection information into said second memory unit and third selector means for selecting either said first or said second memory unit and connecting the selected first or second memory unit to said first selector means.

* * * * *